(12) United States Patent
Campbell et al.

(10) Patent No.: US 7,974,755 B2
(45) Date of Patent: Jul. 5, 2011

(54) MOTOR VEHICLE ACOUSTIC NOISE REDUCTION SYSTEM

(75) Inventors: Brett A. Campbell, Ann Arbor, MI (US); Scott B. Smith, Milan, MI (US); Todd M. Remtema, Milford, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 750 days.

(21) Appl. No.: 11/759,699

(22) Filed: Jun. 7, 2007

(65) Prior Publication Data
US 2008/0306660 A1 Dec. 11, 2008

(51) Int. Cl.
*B60H 1/00* (2006.01)
(52) U.S. Cl. .................. 701/49; 701/1; 701/36
(58) Field of Classification Search .......... 701/1, 36, 701/49
See application file for complete search history.

(56) References Cited

U.S. PATENT DOCUMENTS

| | | | |
|---|---|---|---|
| 2,791,387 A * | 5/1957 | Weinberg ................ 244/137.1 |
| 4,278,922 A * | 7/1981 | Grebe ...................... 318/264 |
| 4,870,333 A | 9/1989 | Itoh et al. |
| 4,995,195 A | 2/1991 | Olberding et al. |
| 5,045,765 A * | 9/1991 | Wissler .................... 318/382 |
| 5,054,686 A * | 10/1991 | Chuang .................... 236/49.3 |
| 5,129,192 A * | 7/1992 | Hannush .................. 49/349 |
| 5,285,137 A | 2/1994 | Midas et al. |
| 5,355,059 A | 10/1994 | McMillan |
| 6,253,135 B1 | 6/2001 | Hubacher |
| 7,877,180 B2 * | 1/2011 | Turner et al. ............... 701/49 |
| 2009/0069984 A1 * | 3/2009 | Turner et al. ............... 701/49 |

FOREIGN PATENT DOCUMENTS

| | | |
|---|---|---|
| DE | 19704857 A1 * | 8/1998 |
| DE | 10222029 B3 * | 2/2004 |
| JP | 60169015 | 9/1985 |

OTHER PUBLICATIONS

DE 19704857 A1, Haas, Aug. 1998, English abstract and English machine translation. Machine translation retrieved Dec. 17, 2009 from http://translate.google.com.*
DE 100222029 B3, Schoener, Feb. 2004, English abstract and English machine translation. Machine translation retrieved Dec. 17, 2009 from http://translate.google.com.*

* cited by examiner

*Primary Examiner* — Khoi Tran
*Assistant Examiner* — Stephen Holwerda
(74) *Attorney, Agent, or Firm* — Gifford, Krass, Sprinkle, Anderson & Citkowski, P.C.

(57) ABSTRACT

A motor vehicle acoustic noise reduction system is provided. The acoustic noise reduction system particularly reduces or eliminates wind throb in a moving vehicle. The system includes a window sensor operable to sense when a first window of the motor vehicle is open. An air inlet is also included which is actuatable to let air into the motor vehicle when the air inlet is in an open position. An actuator associated with and operable to open or close the air inlet is provided and in communication with a controller. The controller is associated with tie sensor and can energize the actuator to place the air inlet in the open position and let air into the motor vehicle when the window sensor senses the first window is in the open position and communicates this information to the controller.

13 Claims, 7 Drawing Sheets

MOTOR VEHICLE ACOUSTIC NOISE REDUCTION SYSTEM

FIELD OF THE INVENTION

This invention relates generally to a motor vehicle acoustic noise reduction system. More specifically, the invention relates to a motor vehicle acoustic noise reduction system that reduces wind throb in a motor vehicle.

BACKGROUND OF THE INVENTION

Most if not all motor vehicles experience acoustic noise when traveling down a road or highway with one or more of the windows in an open position. The acoustic noise can be classified as aerodynamic noise caused by temporal fluctuations of air flow around the body of the moving vehicle. Wind throb is a low frequency noise (approximately 10-50 Hz) that can occur within a motor vehicle compartment when a sunroof or side window is in an open position and the vehicle is in motion. In addition, wind throb is one type of Helmholtz resonance, in which the interior of the motor vehicle acts as a resonance box and applies pressure on the ears of a passenger. If a sunroof is open and causing wind throb, a small device called a wind deflector can prevent the wind throb and make such phenomenon seldom noticeable. However, when driving with a side window open, occupants of a vehicle can experience wind throb when traveling at certain speeds and the use of a wind deflector has proven to be undesirable.

One method of reducing or eliminating wind throb in a motor vehicle is to open a another window. However, some drivers are not knowledgeable that lowering another window will reduce or eliminate wind throb. Drivers can also forget that lowering a second window action can be effective in reducing or eliminating wind throb. Therefore, there is a need for an automated system which can reduce or eliminate wind throb in a moving vehicle.

SUMMARY OF THE INVENTION

A motor vehicle acoustic noise reduction system is provided. The acoustic noise reduction system particularly reduces or eliminates wind throb in a moving vehicle. The system includes a window sensor operable to sense when a first window of the motor vehicle is open and an air inlet which is actuatable to let air into the motor vehicle. An actuator associated with and operable to open or close the air inlet is provided and in communication with a controller associated with the sensor. The controller can energize the actuator to open the air inlet and let air into the motor vehicle.

In an embodiment of the present invention, the controller energizes the actuator to open the air inlet when the window sensor senses the first window has moved from a closed position to an open position. In another embodiment the controller energizes the actuator to open the air inlet when the window sensor senses the first window has moved from a closed position to an open position of greater than 10 centimeters. In yet another embodiment, a vehicle movement sensor is included and operable to sense if the motor vehicle is moving. In this embodiment the controller energizes the actuator to open the air inlet when the window sensor senses the first window has moved from a closed position to an open position and the vehicle movement sensor senses the motor vehicle is moving. In an example, the air inlet is a window of the motor vehicle.

DETAILED DESCRIPTION OF THE PREFERRED EMBODIMENTS

The present invention comprises a method and system for the reduction of acoustic noise, in particular wind throb, in a moving vehicle. As such, the present invention has utility as a method and system for providing a more quiet, comfortable and/or enjoyable ride for the motor vehicle driver and/or other occupants.

The motor vehicle acoustic noise reduction system and method thereof of the present invention includes a window sensor, an air inlet, an actuator and a controller. The window sensor is operable to sense when a first window of the motor vehicle is in an open position. The air inlet is actuatable to let air into the motor vehicle when in an open position. The actuator is associated with and operable to place the air inlet in the open position and in a closed position. The controller, associated with the sensor and the actuator, is operable to energize the actuator to place the air inlet in the open position and thereby let air into the motor vehicle. The system is activated so as to open the air inlet and let air into the motor vehicle when the sensor senses a first window is open and communicates the open position information to the controller, the controller energizes the actuator to open the air inlet, and the actuator opens the air inlet. The opening of the air inlet reduces or eliminates wind throb in the moving motor vehicle.

Figure 1:
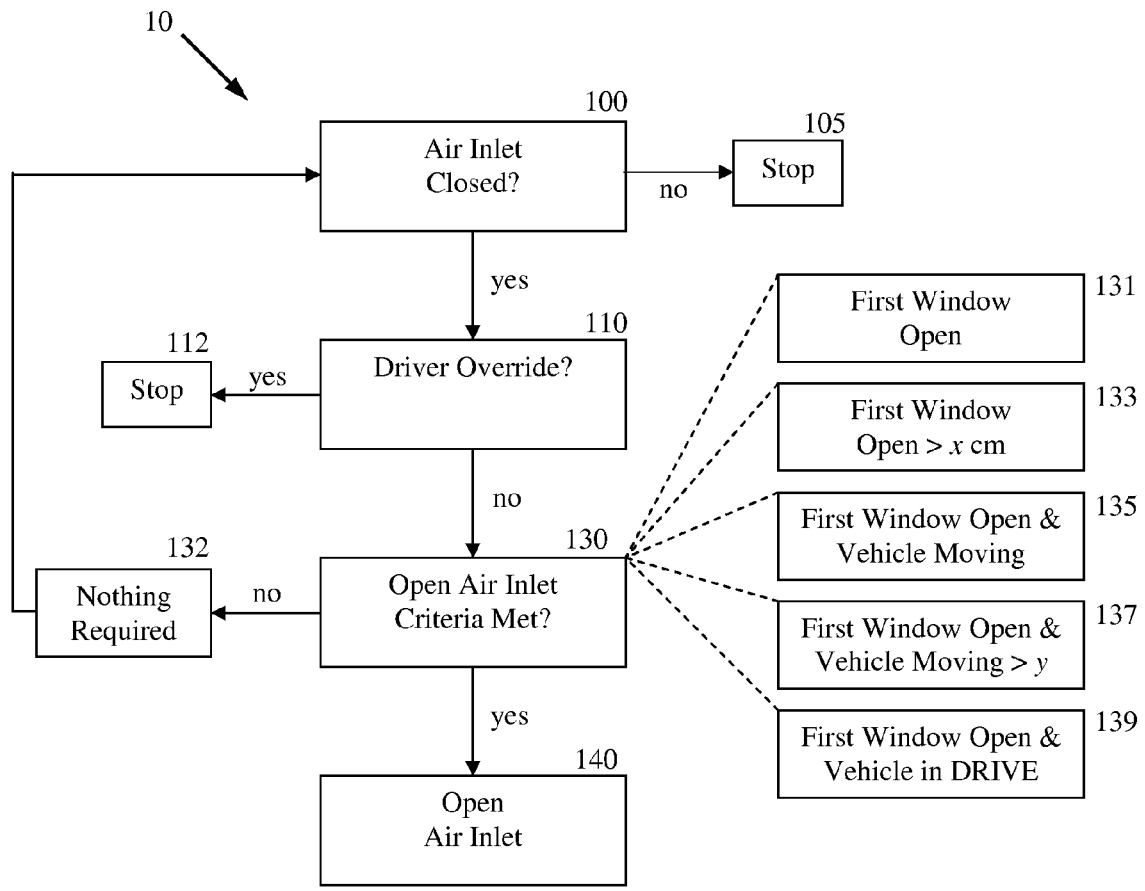
FIG. 1 is a logic diagram illustrating an embodiment of the present invention.

Referring now to FIG. 1, there is illustrated an embodiment of the present invention shown generally at 10 wherein an example of the logic of the acoustic noise reduction system and method thereof is shown. In this embodiment, the system 10 inquires as to whether or not an air inlet of a motor vehicle is closed at step 100. If the air inlet is not closed, then the system 10 stops at step 105. In the alternative, if the air inlet is closed, the system 10 inquires if there is a driver override not to open the air inlet at step 110. If a driver override is in place or activated, the system 10 stops at step 112. If a driver override is not in place, the system 10 inquires as to whether or not a criterion or set of criteria for opening the air inlet has been met at step 130. Any criterion or set of criteria can be established by the manufacturer and/or a user of the motor vehicle as to whether or not to open the air inlet, illustratively including whether a first window is open (step 131), whether a first window is open greater than a specified amount (step 133), whether a first window is open and the vehicle is moving (step 135), whether a first window is open and tie vehicle is moving greater than a specified speed (step 137) and/or whether the first window is open and the vehicle transmission is in DRIVE (step 139). In an example, the criterion at step 133 is whether the first window is open greater than 5 centimeters. In another example, the criterion at 133 is whether the first window is open greater than 10 centimeters. In yet another example, the criterion is whether or not the first window is open greater than 15 centimeters.

It is appreciated that the system and method of the present invention can afford for the user of the motor vehicle to set the amount the first window is open before the criterion illustrated at step 133 is met. The same is true for step 137 wherein the present invention affords for a user of tie motor vehicle to determine and set what speed the motor vehicle must be traveling greater than in order for the criterion at step 137 to be met. In fact, it is within the scope of the present invention for the manufacturer and/or user of the motor vehicle to determine which, if any, criterion or set of criteria is to be selected at step 130.

If the open air inlet criterion or set of criteria is not met at step 130 then nothing is required at step 132 and the system returns back to step 100. In the alternative, if the desired criterion or set of criteria is met at step 130, then the air inlet is opened at step 140.

Figure 2:
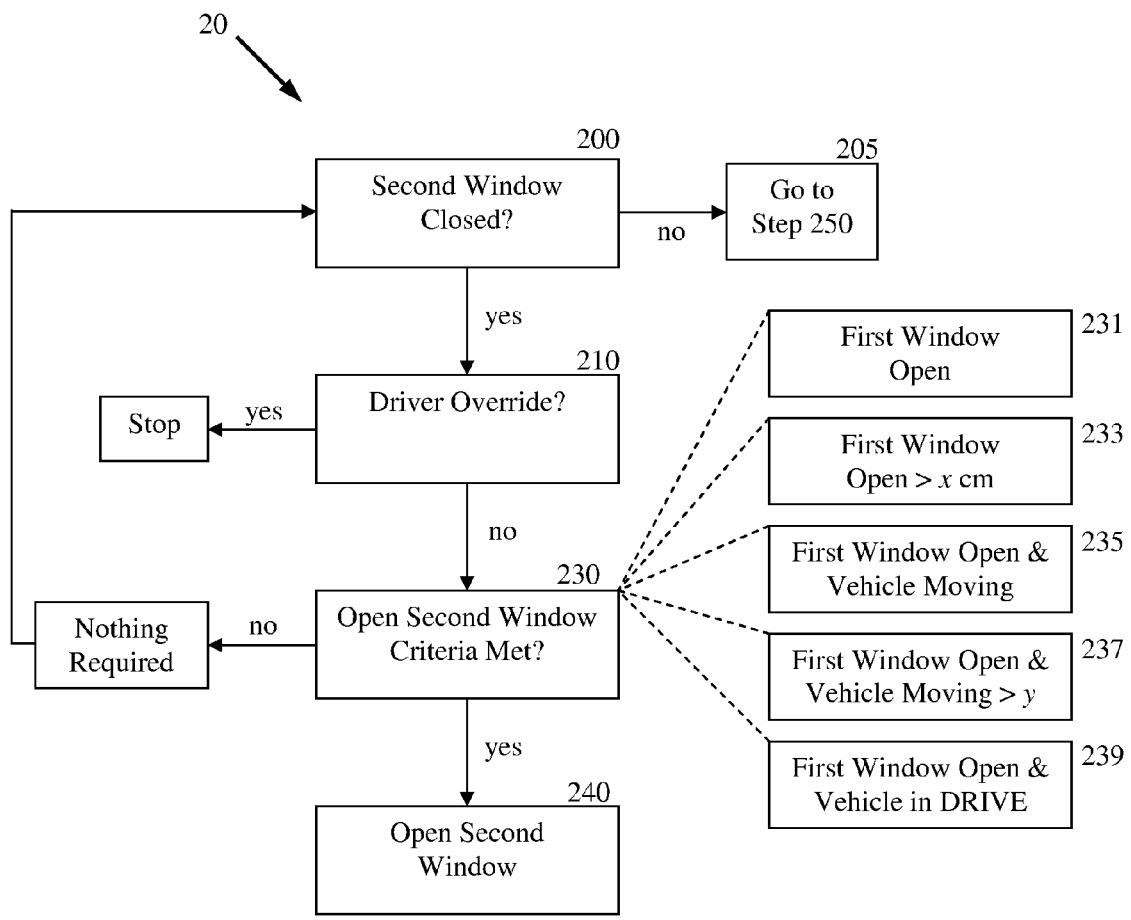
FIG. 2 is a logic diagram illustrating another embodiment of the present invention.

Turning to FIG. 2, another embodiment of the present invention is shown generally at 20. In this embodiment, the air inlet is a second window of the motor vehicle. As illustrated in this figure, the system 20 inquires as to whether or not a second window is closed at step 200. If the second window is open, then the system 20 goes to step 250 via step 205 discussed in greater detail below. If the second window is closed, the system inquires as to whether or not a driver override is in place at step 210. Given that a driver override is not in place, the system 20 proceeds to step 230 and inquires wherein a criterion or set of criteria to open the second window has been met. Similar to the embodiment shown in FIG. 1 and as illustrated in steps 231-239, one or more criterion to be met or satisfied before the second window is opened at step 240 can be included within the system 20. Although not shown in the figure, which window of the motor vehicle is the second window can be determined by the manufacturer and/or user of the motor vehicle. For example, the manufacturer of the motor vehicle may determine that if a rear side window is open, then the rear side window on the opposite side of the vehicle is the appropriate window to be opened in order to best reduce or eliminate wind throb. In the alternative, the driver of the automobile may be in the best position to determine which window best reduces or eliminates wind throb and thereby is afforded the opportunity and mechanism to select the window to be opened when the criterion or set of criteria at step 230 is met.

Figure 3:
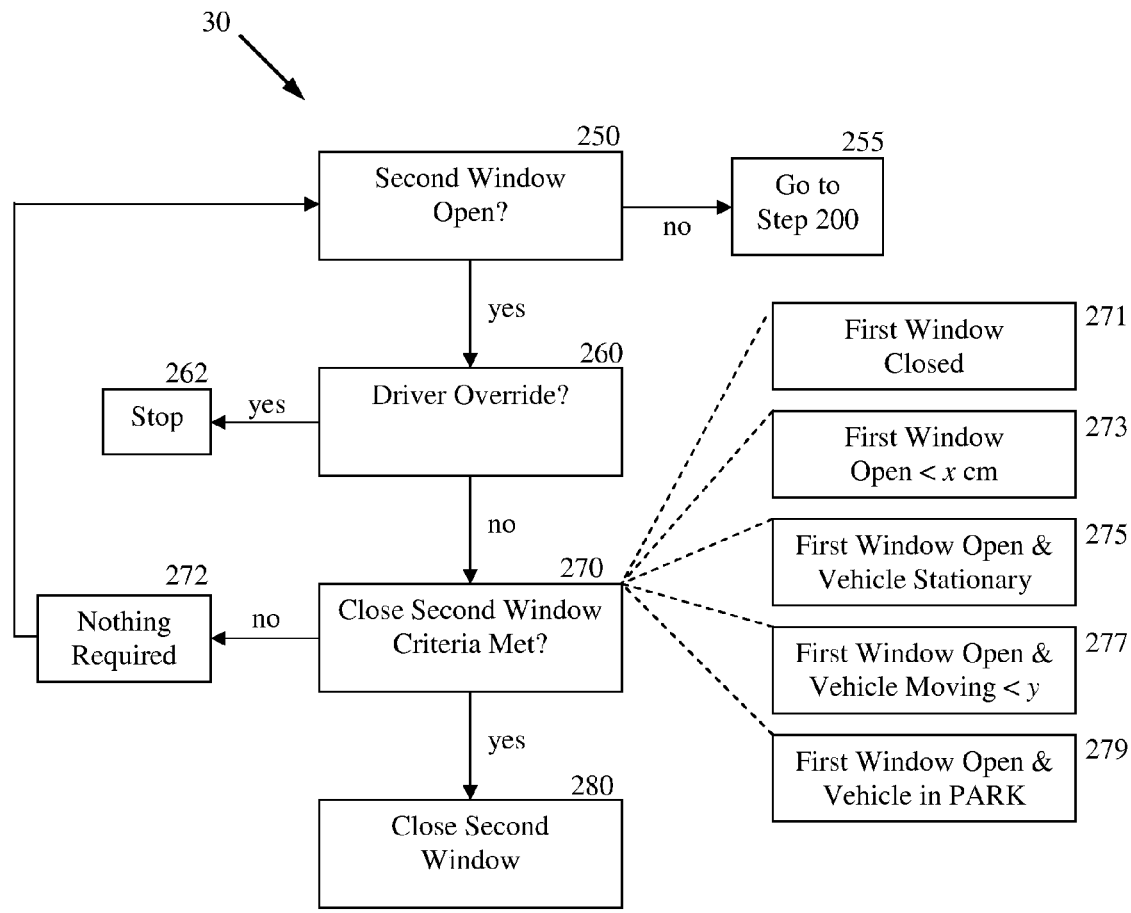
FIG. 3 is an embodiment illustrating another embodiment of the present invention.

Another embodiment of the present invention is illustrated in FIG. 3. In this figure a system 30 for determining when to close the second window is shown. In this embodiment, the system inquires as to whether the second window is open at step 250. If the second window is not open the system 30 returns to step 200 of FIG. 2 via step 255. In the alternative, if the second window is open the system 30 inquires as to whether there is a driver override associated with automatically closing the second window at step 260. If a driver override to not close the second window is in place, the system 30 stops at step 262. If the driver override is not in place, the system 30 proceeds to step 270 and inquires whether or not a criterion or set of criteria regarding closing the second window has been met. Any criterion or set of criteria can be established and used with the present invention, illustratively including whether the first window is closed (step 271), whether a first window has been closed less than a specified amount (step 273), whether a first window is open and the vehicle is stationary (step 275), whether a first window is open and the vehicle is moving less than a specified speed (step 277) and/or whether a first window is open and the vehicle transmission is in PARK (step 279). If a desired criterion or set of criteria has not been met then the system 30 does not initiate any action at step 272 returns back to step 250. In the alternative, if a criterion or set of criteria has been met then the system 30 closes the second window at step 280.

Figure 4:
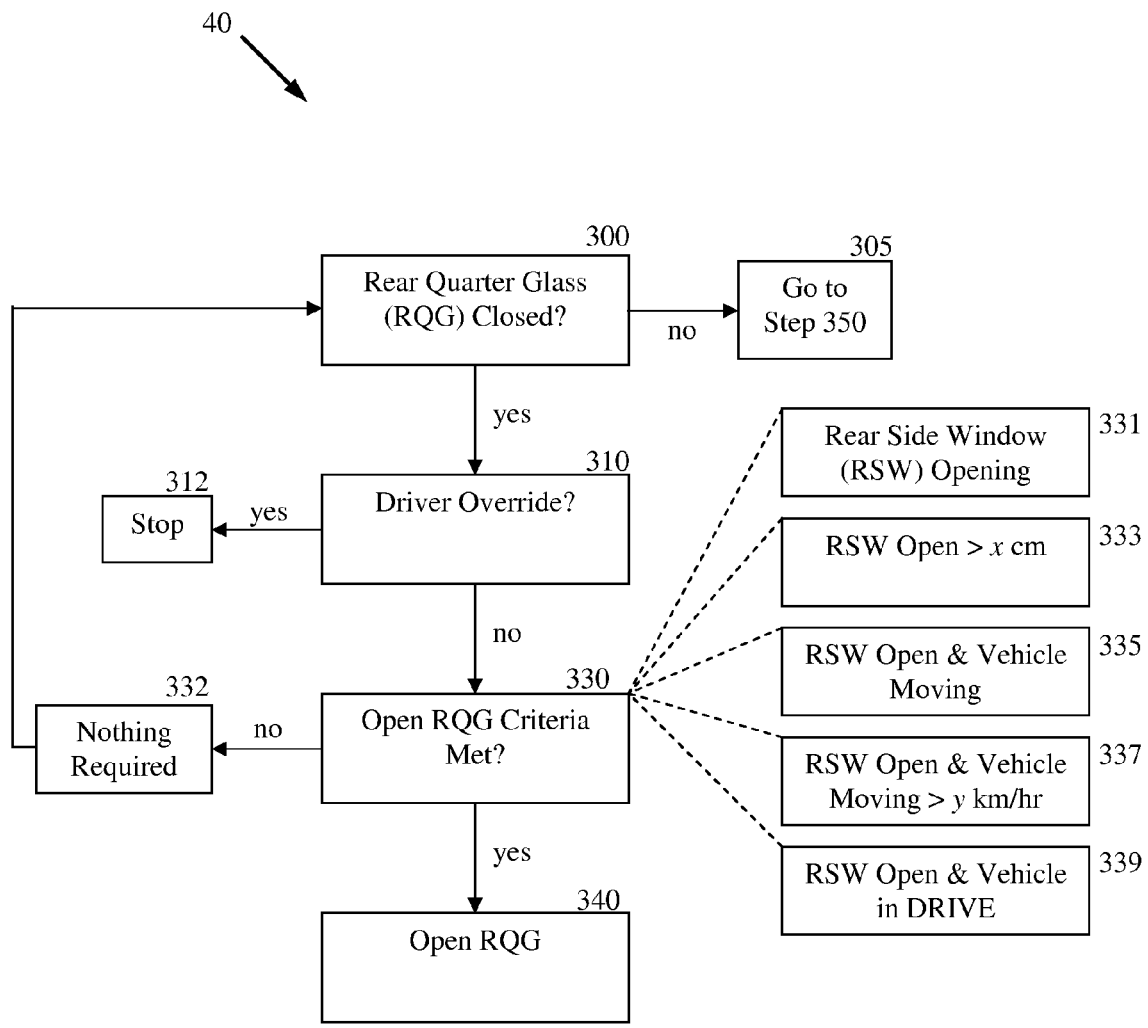
FIG. 4 is a logic diagram illustrating another embodiment of the present invention.
Figure 5:
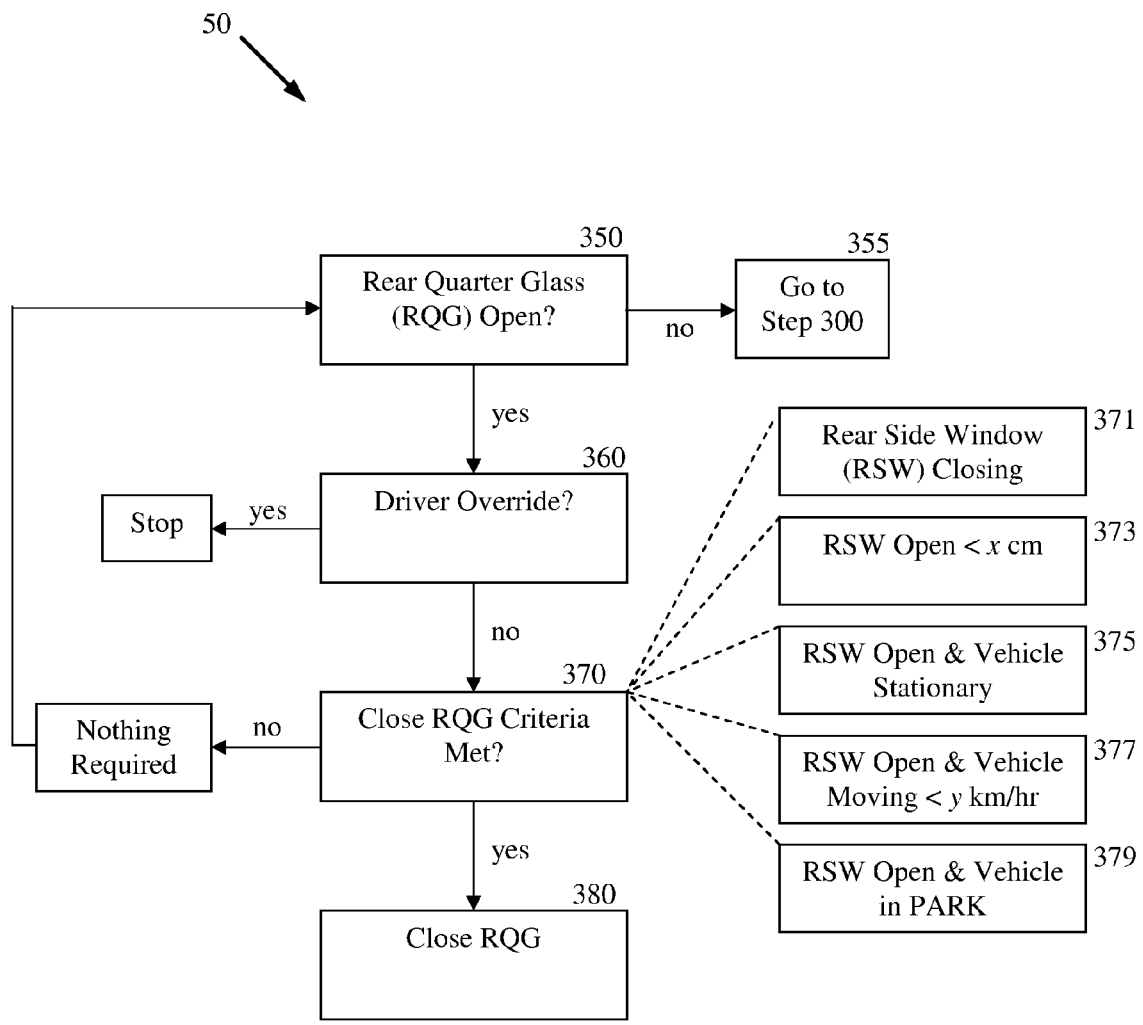
FIG. 5 is a logic diagram illustrating another embodiment of the present invention.

Turning now to FIGS. 4 and 5, an embodiment is shown wherein the first window is a rear side window and the second window is a rear quarter glass of a motor vehicle. As shown in this embodiment, the system 40 inquires as to whether or not the rear quarter glass is closed at step 300. If the rear quarter glass is not closed, the system 40 goes to step 350 in FIG. 5. If the rear quarter glass is closed the system 40 can include a step 310 wherein an inquiry into whether or not a driver override associated with opening the rear quarter glass is in place. If the driver override to not open the rear quarter glass is in place, the system 40 stops at step 312. In the alternative, the system 40 proceeds to step 330 wherein an inquiry into whether or not a criterion or set of criteria related to opening the rear quarter glass has been met. In this embodiment, any criterion or set of criteria can be established and employed as to whether or not the rear quarter glass should be automatically opened, illustratively including whether the rear side window is open (step 331), whether the rear side window is open greater than a specified mount (step 333), whether the rear side window is open and the vehicle is moving (step 335), whether the rear side window is open and the vehicle is moving greater than a specified speed (step 337) and/or whether the rear side window is open and the vehicle is in DRIVE (step 339). If a desired criterion or set of criteria has not been met then the system 40 does not execute any action as shown in step 332 and returns to step 300. In the alternative, the system 40 opens the rear quarter glass at step 340. It is appreciated that the amount the second window, in this case the rear quarter glass, is opened can be determined by tie manufacturer and/or user of the motor vehicle.

Once the rear quarter glass has been opened the system 40 affords for the automatic closing of the window. A system 50 of performing this operation is illustrated in FIG. 5 wherein at step 350 the system 50 inquires whether or not the rear quarter glass is open. If the rear quarter glass is not open the system 50 is instructed to go to step 300 in FIG. 4. In the alternative, the system 50 inquires whether or not there is a driver override to keep the rear quarter glass open at step 360. If no such override is in place, the system inquires as to whether or not a criterion or set of criteria has been met to close the rear quarter glass at step 370. Assuming such a criterion or set of criteria has been met, for example one or more of the criterion shown at steps 371-379, the system 50 closes the rear quarter glass at step 380.

Figure 6:
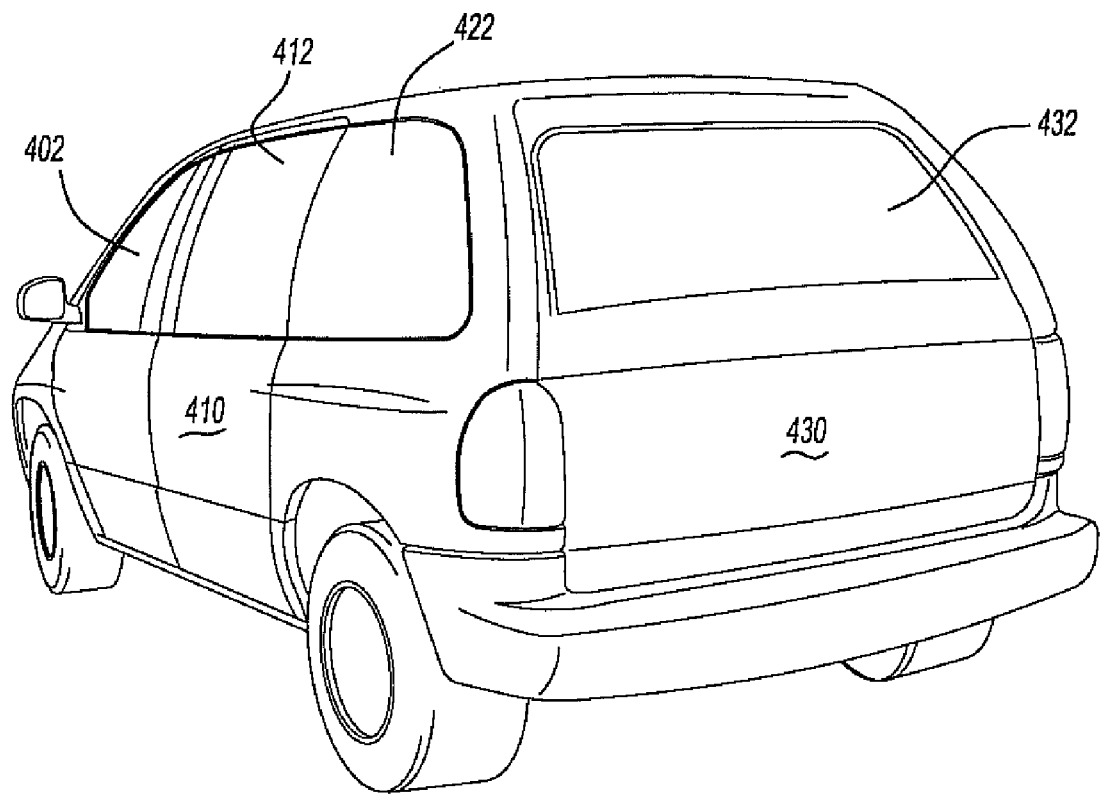
FIG. 6 is a perspective view of a motor vehicle.
Figure 7:
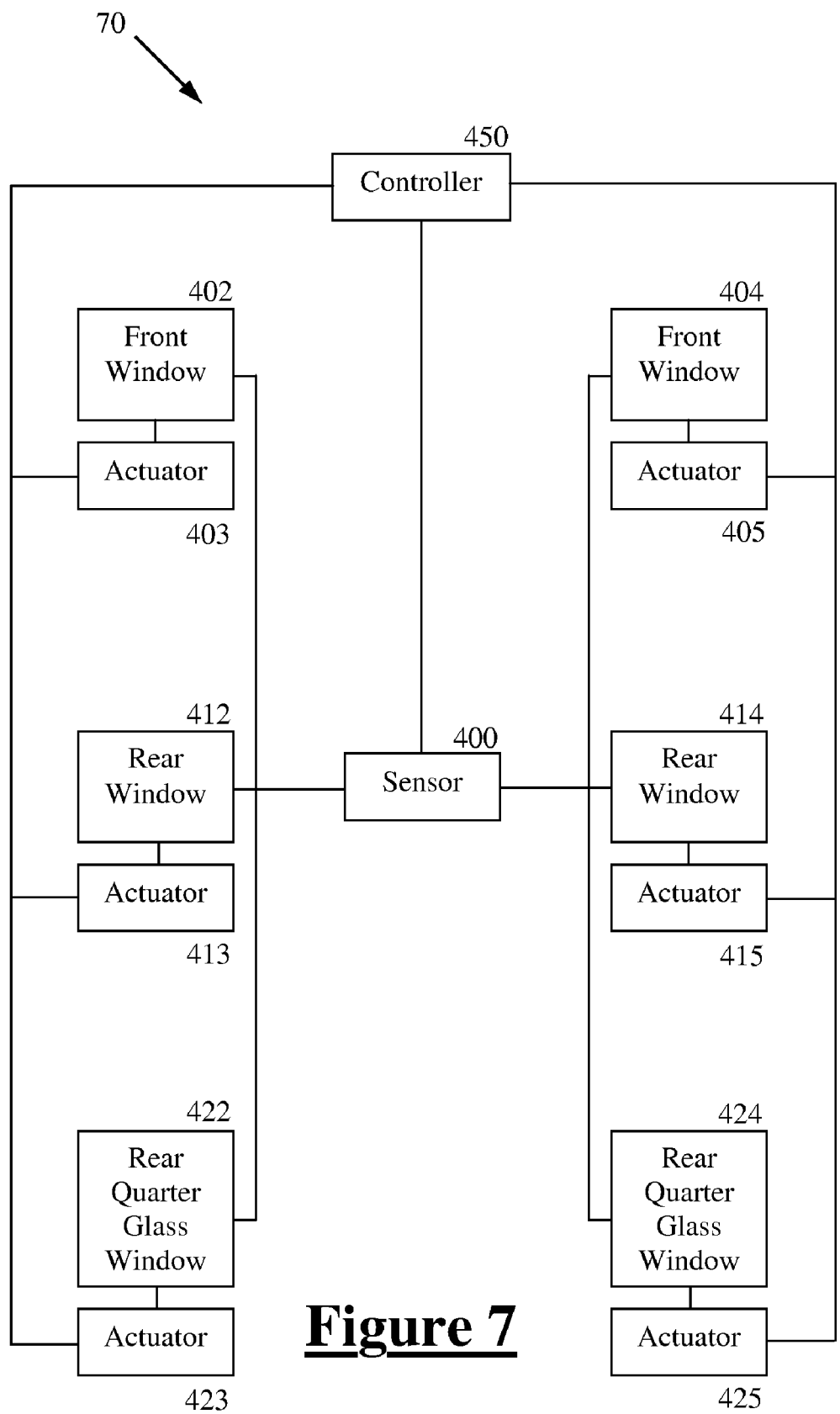
FIG. 7 is a schematic diagram of a noise reduction system of the present invention.

Turning now to FIGS. 6 and 7, a schematic diagram 70 in accord with the present invention and associated with a motor vehicle is illustrated. It is appreciated that the above discussion relating to FIGS. 1-5 regarding the logic of the system and method of the present invention is included in the discussion of the motor vehicle and schematic diagram shown in FIGS. 6 and 7. FIG. 6 shows a perspective of a minivan-type vehicle wherein a front window 402, a rear side window 412 and a rear quarter glass 422 are shown. The rear side window 412 is part of a sliding door 410. A back window 432, as part of a back door 430 can also be included. It is appreciated that a front window, rear side window and a rear quarter glass are also present on the other side of the vehicle. FIG. 7 illustrates a schematic diagram 70 of The system associated with the motor vehicle shown in FIG. 6.

The system includes a sensor 400 in communication with the front windows 402 and 404, rear windows 412 and 414, and rear quarter glass windows 422 and 424. Although not illustrated in FIG. 7, the sensor 400 could also be in communication with the rear window 432. All of the windows shown in this diagram have an associated actuator therewith. In addition, a controller 450 is in communication with each of the actuators. Upon opening a first window, for example rear window 412, the sensor 400 senses the window is in an open position. The sensor 400 communicates the open position information to the controller 450, and the controller 450 affords for the actuator 423 to open the rear quarter glass window 422. In the alternative, depending upon the logic of the system as determined by the manufacturer and/or user of the motor vehicle, the controller 450 could energize actuator 415 to open rear window 414. The sensor and controller can also afford for the closing of a second window when a specified criterion or criteria has been met. For example if the system has opened the rear glass window 424 in response to the opening of rear window 412, and the driver of the vehicle then opens front window 402, the system can afford for the automatic closing of rear quarter glass window 424. In addition, if the motor vehicle comes to a stationary position and/or the vehicle transmission is placed in PARK, the system can afford for the closing of rear quarter glass window 424.

It is appreciated that the controller 450 can be in the form of a microprocessor and/or a series of switches. In addition, sensor 400 can include a plurality of sensors whereby a single sensor is associated with each window of the motor vehicle. It is assumed that all of the windows of the motor vehicle are power or electric windows, however this not required. For example, the front windows 402 and 404 and rear windows 412 and 414 can be manual windows while the rear quarter glass windows 422 and 424 are power windows. The rear quarter glass windows 422 and 424 can also include a system for manually opening and closing the windows.

The foregoing drawings, discussion and description are illustrative of specific embodiments of the present invention, but they are not meant to be limitations upon the practice thereof. Numerous modifications and variations of the invention will be readily apparent to those of skill in the art in view of the teaching presented herein. It is the following claims, including all equivalents, which define the scope of the invention.

We claim:

1. A method for reducing acoustic noise within a motor vehicle having windows and resulting from lowering a window of the motor vehicle, said method comprising the steps of:
    providing a window sensor operable to sense when a first window of the motor vehicle is open;
    providing a vehicle movement sensor operable to sense when the motor vehicle is moving greater than a specified speed;
    providing an actuator operable to open an air inlet and let air into the motor vehicle;
    providing a controller operable to activate the actuator to open the air inlet when the motor vehicle is traveling greater than the specified speed and when the window sensor senses the first window is open and communicates the open window position to the controller; and
    the window sensor sensing the first window of the motor vehicle is open and communicating the open window position to the controller;
    the vehicle movement sensor sensing the motor vehicle is traveling greater than the specified speed and;
    the controller activating the actuator to open the air inlet.

2. The method of claim 1, wherein the first window is selected from the group consisting of a front window and a rear window.

3. The method of claim 1, wherein the air inlet is a second window of the motor vehicle, the second window selected from the group consisting of a front window, a rear window, a rear quarter glass window, a back window and a sunroof window.

4. The method of claim 1, wherein the first window is a rear side window on a sliding door and the air inlet is a rear quarter glass window of the motor vehicle.

5. The method of claim 4, wherein the controller energizes the actuator to open the rear quarter glass window when the window sensor senses the rear side window has moved from a closed position to the open position of greater than 10 centimeters and communicates open window position to the controller.

6. The method of claim 4, wherein the controller energizes the actuator to open the rear quarter glass window when the window sensor senses the rear side window has moved from a closed position to the open position of greater than an amount specified by a user of the motor vehicle and the window sensor communicates the open window position to the controller.

7. The method of claim 1, wherein the controller energizes the actuator to open a rear quarter glass window when the window sensor senses a rear side window has moved from a closed position to the open position and the vehicle movement sensor senses the motor vehicle is moving; and
    the window sensor communicates the rear side window is open and the vehicle movement sensor communicates the vehicle is moving to the controller.

8. A system for reducing acoustic noise within a motor vehicle having windows comprising:
    a window sensor in communication with a window, said sensor operable to sense a position of said window and communicate a window position information;
    an air inlet actuatable to let air into the motor vehicle;
    an actuator operable to place said air inlet in an open position and a closed position;
    a vehicle movement sensor operable to sense if the motor vehicle is traveling greater than a specified speed;
    a controller operable to receive said window position information from said window sensor and energize said actuator to place said air inlet in said open position when said window sensor senses said window is open and said vehicle movement sensor senses the motor vehicle is moving faster than said specified speed.

9. The system of claim 8, wherein said air inlet is a second window.

10. The system of claim 8, wherein said window is a rear side window and said air inlet is a rear quarter glass of the motor vehicle.

11. A method for reducing wind throb noise within a motor vehicle having a rear side window and a rear quarter glass, the wind throb noise resulting from lowering the rear side window of the motor vehicle, said method comprising the steps of:
    providing a window sensor operable to sense when the rear side window of the motor vehicle is open;
    providing an actuator operable to open the rear quarter glass to let air into the motor vehicle;
    providing a vehicle movement sensor operable to sense when the motor vehicle is traveling greater than a specified speed;
    providing a controller operable to activate the actuator to open the rear quarter glass and let air into the motor vehicle when the window sensor senses the rear side window is in an open position and at least one of when the motor vehicle is traveling faster than the specified speed and the vehicle transmission is in DRIVE; and the window sensor sensing the rear side window is open and communicating the open window position to the controller;

at least one of the vehicle movement sensor sensing the motor vehicle is traveling greater than the specified speed and the vehicle transmission is in DRIVE; and the controller activating the actuator to open the rear quarter glass.

12. The method of claim 11, wherein the controller energizes the actuator to open the rear quarter glass window when the window sensor senses the rear side window has moved from a closed position to the open position of greater than 10 centimeters and communicates the open window position to the controller.

13. The method of claim 11, wherein the controller energizes the actuator to open the rear quarter glass window when the window sensor senses the rear side window has moved from a closed position to the open position of greater than an amount specified by a user of the motor vehicle and the window sensor communicates the open window position to the controller.

* * * * *